(12) United States Patent
Lapidot et al.

(10) Patent No.: US 10,925,212 B2
(45) Date of Patent: Feb. 23, 2021

(54) SYSTEM AND METHOD FOR HARVESTING AQUATIC PLANTS

(71) Applicant: Hineman Ltd., Rihson LeZion (IL)

(72) Inventors: Miri Lapidot, LeHavim (IL); Oren Shani, Pardes Hanna-Karkur (IL); Amit Inbart, Beit Elazari (IL)

(73) Assignee: Hinoman Ltd., Rishon LeZion (IL)

( * ) Notice: Subject to any disclaimer, the term of this patent is extended or adjusted under 35 U.S.C. 154(b) by 0 days.

(21) Appl. No.: 16/294,956

(22) Filed: Mar. 7, 2019

(65) Prior Publication Data

US 2019/0274247 A1      Sep. 12, 2019

Related U.S. Application Data

(60) Provisional application No. 62/639,570, filed on Mar. 7, 2018.

(51) Int. Cl.
*A01D 44/00* (2006.01)
*A01G 33/00* (2006.01)
*E02B 15/10* (2006.01)

(52) U.S. Cl.
CPC ............. *A01D 44/00* (2013.01); *A01G 33/00* (2013.01); *E02B 15/102* (2013.01); *E02B 15/103* (2013.01); *E02B 15/104* (2013.01)

(58) Field of Classification Search
CPC ...... E02B 15/00; E02B 15/102; E02B 15/103; E02B 15/104; A01D 44/00; A01G 33/00
USPC ... 210/170.05, 170.09, 170.1, 170.11, 242.1, 210/242.3, 747.5, 747.6, 776; 56/8, 9
See application file for complete search history.

(56) References Cited

U.S. PATENT DOCUMENTS

| | | | | |
|---|---|---|---|---|
| 3,358,838 A | * | 12/1967 | Kosar | E02B 15/102 210/242.3 |
| 3,449,892 A | | 6/1969 | Huff | |
| 4,253,271 A | | 3/1981 | Raymond | |
| 4,473,469 A | * | 9/1984 | Ayroldi | E02B 15/102 210/242.3 |
| 4,600,694 A | * | 7/1986 | Clyde | A01G 33/00 210/151 |
| RE32,298 E | * | 12/1986 | Baer | E02B 15/102 210/242.3 |

(Continued)

FOREIGN PATENT DOCUMENTS

| | | |
|---|---|---|
| GB | 2254801 | 10/1992 |
| KR | 10-2014-0142502 | 12/2014 |
| WO | WO 2019/171380 | 9/2019 |

OTHER PUBLICATIONS

International Search Report and the Written Opinion dated Jun. 20, 2019 From the International Searching Authority Re. Application No. PCT/IL2019/050251. (17 Pages).

(Continued)

*Primary Examiner* — Christopher Upton (57) ABSTRACT

A harvesting system for harvesting aquatic plants in or floating on a culture medium a harvesting bed configured to be circulated in and out of the culture medium. An actuator circulates the harvesting bed, a scraper positioned against a surface of the harvesting bed scraps the aquatic plants on the harvesting bed and a channel transports the aquatic plants removed by the scraper toward a collection vat. The collection vat receives the aquatic plants transported via the channel.

29 Claims, 10 Drawing Sheets
(3 of 10 Drawing Sheet(s) Filed in Color)

(56) References Cited

U.S. PATENT DOCUMENTS

| | | | | |
|---|---|---|---|---|
| 4,797,205 | A | * | 1/1989 | Kitamura .............. E02B 15/102 |
| | | | | 210/242.3 |
| 5,167,815 | A | * | 12/1992 | Bachmann ............ E02B 15/102 |
| | | | | 210/242.3 |
| 5,197,263 | A | | 3/1993 | Midtling et al. |
| 5,460,735 | A | * | 10/1995 | Burt ...................... E02B 15/102 |
| | | | | 210/776 |
| 5,522,990 | A | * | 6/1996 | Davidian .............. E02B 15/102 |
| | | | | 210/242.3 |
| 5,659,977 | A | | 8/1997 | Jensen et al. |
| 8,287,740 | B2 | * | 10/2012 | Newman ................ A01D 44/00 |
| | | | | 210/747.5 |
| 8,388,839 | B1 | | 3/2013 | Hobson et al. |
| 2012/0117869 | A1 | | 5/2012 | Javan et al. |
| 2015/0250113 | A1 | | 9/2015 | Shoham et al. |

OTHER PUBLICATIONS

International Preliminary Report on Patentability dated Sep. 17, 2020 From the International Bureau of WIPO Re. Application No. PCT/IL2019/050251. (11 Pages).

* cited by examiner

SYSTEM AND METHOD FOR HARVESTING AQUATIC PLANTS

RELATED APPLICATIONS

This application claims the benefit of priority under 35 USC § 119(e) of U.S. Provisional Patent Application No. 62/639,570 filed on Mar. 7, 2018, the contents of which are incorporated herein by reference as if fully set forth herein in their entirety.

FIELD AND BACKGROUND OF THE INVENTION

The present invention, in some embodiments thereof, relates to a system and method for harvesting aquatic plants and, more particularly, but not exclusively, to a system and method for harvesting duckweed from a body of water.

Some aquatic plants such as duckweed and aquatic algae are known for their high nutritional value as well as their rapid growth rate. Due to these qualities there is a growing interest in using such aquatic plants for various applications. Known applications include water remediation, bio-energy production, and more recently for food application. Duckweed is known to have a relatively high protein yield, e.g. as compared to soya beans, high green pigment content and as well as being a good vitamins and polyphenol source.

*Wolffia* also known as watermeal is one known genus of duckweed. *Wolffia* are gibbous and float unattached on fresh water surfaces. *Wolffia globosa* is an example species of *Wolffia*. *Wolffia globosa* is known to grow in mats on the surface of calm, freshwater bodies, such as ponds, lakes, and marshes. It is a very tiny, oval-shaped plant with no leaves, stems, or roots. *Wolffia globosa* has been described as the world's smallest flowering plant, at 0.1-1 mm in diameter. Like other *Wolffia*, the plant is edible and makes a nutritious food.

Although the potential for aquatic plants such as duckweed and aquatic algae may be vast, difficulties associated with harvesting is usually the largest deterrent to realizing the practical and economical cultivation of these aquatic plants.

U.S. Patent Publication No. 2012/0117869 entitled "Cultivation, harvesting and processing of floating aquatic species with high growth rate" describes an apparatus for culturing a duckweed species outdoors. The apparatus includes a container configured to contain the duckweed species in culture medium. The container has a raceway configuration allowing the culture medium to flow in a continuous loop, a propulsion mechanism to cause the motion thereof and a sensor configured to monitor thickness of a floating mat of the duckweed species. A harvesting system includes a conveyer belt configured to be lowered into the culture medium below the floating mat of the duckweed species and a surface skimmer configured to skim a top surface of the culture medium. It is also described that the harvesting system includes a mechanism for recycling the culture medium to the container.

U.S. Pat. No. 5,197,263 entitled "Method and apparatus for harvesting aquatic plants," describes a recovering a duckweed slurry from the body of water by adjusting a feed head having a mixing chamber, the feed head being proximate the surface of the body of water so duckweed from the surface of the body of water, and water from the body of water flow into the feed head and the mixing chamber. Duckweed slurry comprising duckweed and water from the body of water is transported to a land-based dewatering station in which a majority of the water is removed. The water removed from the duckweed slurry is then returned to the body of water.

SUMMARY OF THE INVENTION

According to an aspect of some embodiments of the present invention there is provided a system and method to continuously harvest aquatic plants in a culture medium while maintaining stable growing conditions in the culture. In some example embodiments, the harvesting is based on skimming a surface of a culture medium. According to some example embodiments, the harvesting (or skimming) is performed without disrupting a floating or immersed culture surface area of the aquatic plants, e.g. without breaking a continuum of a floating or immersed mat formed by the aquatic plants. Maintaining the floating (or immersed) culture surface area intact during harvesting is advantageous as it may significantly reduce a potential of algae contamination that may occur due to unintentional light penetration. According to some example embodiments, system and method also provides for harvesting the aquatic plant with little residual of liquid medium and with substantially no mechanical damage to the aquatic plant.

According to an aspect of some example embodiments there is provided a harvesting system for harvesting aquatic plants in or floating on a culture medium, the system comprising: a harvesting bed configured to be circulated in and out of the culture medium; an actuator configured to circulate the harvesting bed; a scraper positioned against the harvesting bed and configured to scrape the aquatic plants on the harvesting bed; a channel configured to transport the aquatic plants removed by the scraper; and a collection vat configured to receive the aquatic plants transported via the channel.

Optionally, the harvesting bed is a plate and wherein the actuator is configured to rotate the plate about an axis of rotation, wherein the axis of rotation is perpendicular to the harvesting bed.

Optionally, the plate is fixedly supported on an axle and wherein the actuator is configured to rotate the axle.

Optionally, the system includes a plurality of plates is fixedly supported on a single axle and wherein the actuator is configured to rotate the axle.

Optionally, the plate is disc shaped.

Optionally, the plate has a thickness of 1-15 mm.

Optionally, the system includes a Z stage configured to position the plate at a desired height.

Optionally, the harvesting bed is a belt.

Optionally, the belt is an endless belt that is circulated with a conveyor system.

Optionally, the belt is configured to be immersed in the culture medium such that a surface of the belt is parallel to a direction of flow in a tank containing the culture medium.

Optionally, the harvesting bed is a roller.

Optionally, the scraper is stationary and circulation of the harvesting bed is configured to actuate scraping of the aquatic plants.

Optionally, the scraper is fixedly attached to a trough configured to collect the aquatic plants scraped by the scraper.

Optionally, the trough is tilted toward the channel.

Optionally, the system includes a pair of the scrapers positioned against each of the two opposing flat surfaces of the harvesting bed.

Optionally, the includes a nozzle configured to spray fluid on a surface of the harvesting bed at a height above a position of the scraper; and a fluid source configured to supply the nozzle with fluid.

Optionally, the fluid is water.

Optionally, the system includes a pair of the nozzles configured to spray fluid on each of two opposing surfaces of the harvesting bed.

Optionally, the system includes a controller configured to control a rate of the circulating.

According to an aspect of some example embodiments there is provided a method for harvesting aquatic plants in or floating on a culture medium, the method comprising: partially immersing a harvesting bed in a culture medium, the culture medium comprising aquatic plants; circulating the harvesting bed in and out of the culture medium; scraping the aquatic plants adhering to the harvesting bed as the harvesting bed as it is being circulated; channeling the aquatic plants removed by the scraper toward a collection vat; and collecting the aquatic plants in the collection vat.

Optionally, the harvesting bed is a plate.

Optionally, the scraping is actuated based on the rotating of the plate.

Optionally, the method includes spraying a portion of the plate above the scraper with a fluid.

Optionally, the method includes aligning an edge of the plate with a direction of flow of the culture medium.

Optionally, the method includes aligning a surface of the plate at an acute angle with respect to a direction of flow of the culture medium.

Optionally, the method includes partially immersing a plurality of plates in a culture medium wherein the plurality of plates displaced from each other by a defined distance and wherein the plurality of plates are rotated about a same axis of rotation.

Optionally, the harvesting bed is an endless belt that is circulated with a conveyor system.

Optionally, the method includes immersing the endless belt in the culture medium such that a surface of the belt is parallel to a direction of flow in a tank containing the culture medium.

Optionally, the method includes aligning a surface of the belt at an acute angle with respect to a direction of flow of the culture medium.

Optionally, the harvesting bed is a roller.

Optionally, the method includes positioning a longitudinal axis of the roller perpendicular to a flow direction of the culture medium.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings (including images). With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a system and method for harvesting aquatic plants and, more particularly, but not exclusively, to a system and method for harvesting duckweed from a body of water.

According to some example embodiments, a harvesting system includes a harvesting bed that is circulated in and out of the culture medium. According to some example embodiments, the harvesting bed is at least one rotating plate, e.g. disc that is configured to be partially submerged in the culture medium so that it cuts into the surface of the medium as it rotates about its axis. As the disc is rotated, the aquatic plants floating on or near the surface of the culture medium may adhere to surfaces of the disc. Optionally, the aquatic plants that adhere to the disc may grow fully immersed in the culture medium. Adhesion to the surfaces of the disc may be due to adhesive properties of the aquatic plant and may also be due to surface tension between the plant and the surface of the disc. According to some example embodiments, the disc is mounted on an axle or a shaft rotated with a motor. Optionally, more than one disc may be mounted on a shaft.

In some example embodiments, more than one shaft each with one or more discs may be extended into the tank with the culture medium. In some example embodiments, the tank includes flow in a defined direction and the disks are oriented in a direction of the flow so surfaces of the discs are substantially parallel to a direction of flow. As such, the discs do not disturb the flow through the tank and a mat that may be formed by the aquatic plants is left intact.

According to some example embodiments, the harvesting system additionally includes a scraper that engages the disc above a surface of the culture medium and scraps off the aquatic plants from surfaces of the disc. The scraping may be actuated by rotation of the disc. The aquatic plants removed from surfaces of the disc may then be pipelined through a collection channel positioned below the scraper and into a collection tank. Optionally, the harvesting system additionally includes a water drip or spray nozzle that directs a water flow on the surfaces of the rotating disc above the scraper. The water flow may assist in detaching the aquatic plant from the surface of the disc and may also provide flow for channeling the collected aquatic plants through the collection channel in to the collection tank. Optionally, the disc may be replaced by a plurality of blades.

According to some example embodiments, the harvesting bed is a belt. In some example embodiments, the belt is part of a conveyor system that is partially immersed in the culture medium. As portions of the belt are immersed in the culture medium the aquatic plants adhere to surfaces of the belt. Scrapers positioned along the belt above the culture medium may scrap a surface of the belt as the belt is advanced between rotating drums of the system. The system may also include water drips or nozzles that direct a water flow on the surfaces of the belt to aid in releasing the plants from the surface of the belt. Optionally, the belt is oriented so that its surface is parallel with a direction of flow of the culture medium in the tank. In this orientation, movement of the belt does not significantly break up the mat formed by the aquatic plants.

According to embodiments of the present invention, the harvesting system provides continuous harvesting of the floating material in a fully automated operation. Optionally, a rate at which the aquatic plant is harvested may be controlled based on one or more of controlling a depth at which the disc is submerged in the culture medium, controlling rotation speed of the discs and number of discs being used for harvesting. Optionally, harvesting may also be controlled based selectively altering a material of the disc. In some example embodiments, an angle of the rotating disc may be altered to actuate a mixing of the culture medium. Optionally, the harvesting system may be positioned on a bend in the flow direction of the culture medium so that an angle (an acute angle) is formed between a direction of flow and a surface of the disc. Optionally, the angle may be between 0-60 degrees. Optionally, the harvesting system is positioned at a rounded end of a raceway tank. For example, the discs, which are rotating perpendicular to the water surface, may be placed in parallel to the flow direction, causing no disturbance to the water flow or in a minimal angle to the laminar flow, causing slight disturbance to the water motion and generating desired mixing effect. Optionally, the angle at which the disc is positioned with respect to the direction of flow may be periodically altered to further perturb the medium. Optionally, mixing may assist in dispersion of the nutrients in the medium.

According to some example embodiments, the harvesting system is configured to be a self-regulated system. The amount of plants able to adhere to a rotating disc may be in direct proportion to density of the aquatic plant in the pool. Optionally, the harvesting system may include a sensor configured to sense density of material adhered to the rotating disc. Optionally, the sensor includes a camera that is configured to capture images of the surface of the disc as it immerges from the culture medium.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
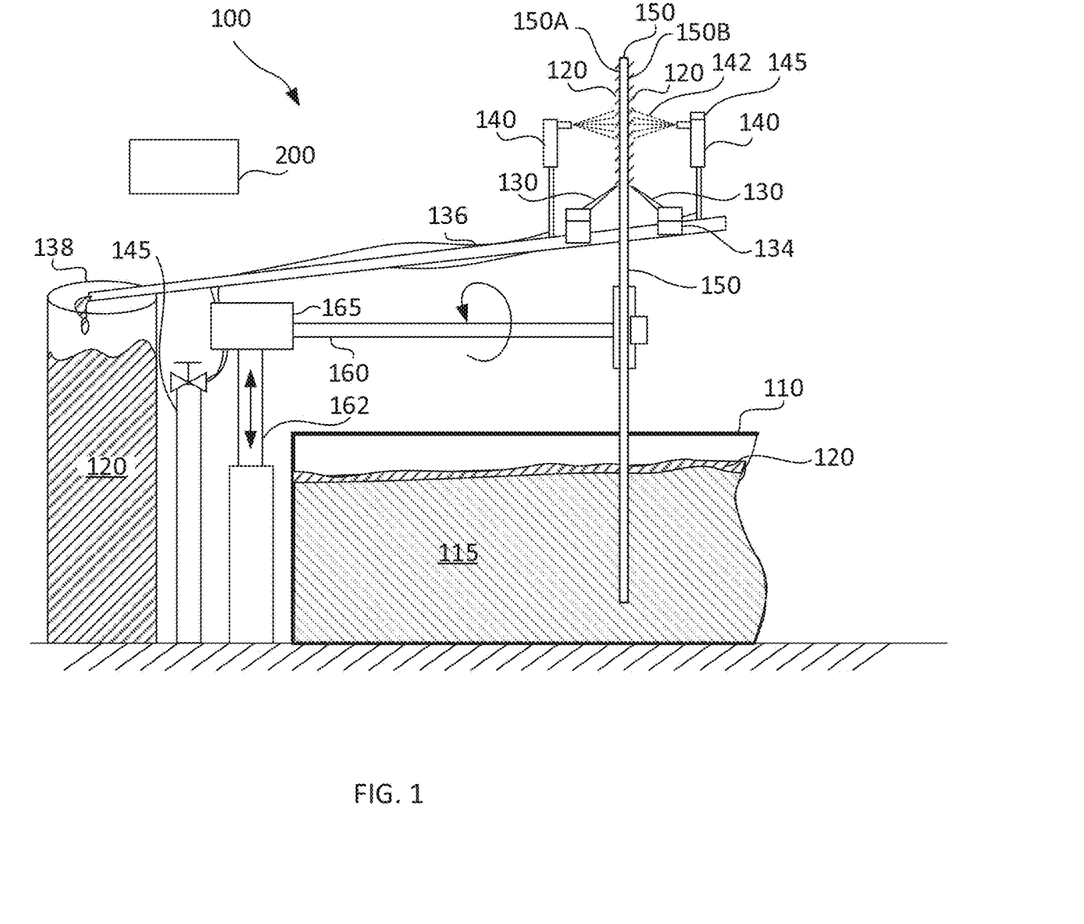
FIG. 1 is a simplified schematic drawing of an example harvesting system in accordance with some example embodiments.

Reference is now made to FIG. 1 showing a simplified schematic drawing of an example harvesting system in accordance with some example embodiments. According to some embodiments, a harvesting system 100 includes a disc 150 providing two opposing surfaces on which aquatic plants 120 may adhere when disc 150 is dipped into a tank 110 in which aquatic plants 120 are cultivated in culture medium 115. Disc 150 may be supported by an axle or shaft 160 fixedly engaged to a center of disc 150 and rotated about its longitudinal axis with motor 165. Disc 150 may be partially immersed in tank 110 at a substantially vertical orientation so that an edge of disc 150 cuts into the body of water as disc 150 is rotated without substantially disrupting a continuum of a floating or immersed mat formed by aquatic plants 120. In some example embodiments, tank 110 may include induced flow in a defined raceway and disc 150 may be oriented in tank 110 so that it surface is parallel to a direction of the flow. Alternatively, disc 150 may be oriented in tank 110 so that its surface is angled with respect to a direction of the flow. Optionally, angling disc 150 with a direction of the flow induces mixing of the culture medium.

According to some embodiments of the present invention, a scraper 130 is positioned to engage each of surfaces 150A and 150B of disc 150 at a height above the surface of the culture medium 115 in tank 110 and scrapes off plants 120 collected on disc 150. As disc 150 continues to rotate, a section of disc 150 that has been scraped with scraper 130 is immersed again in the culture medium and provides a clean area on which additional plants 120 may adhere. Plants 120 scraped off the disc 150 may be collected in a trough 134 and channeled through a channel 136 to a collecting vat 138.

According to some example embodiments, harvesting system 100 additionally includes a nozzle 140 connected to a water source 145 that sprays fluid 142, e.g. water on a surface of disc 150 above scraper 130. Nozzle 140 may be installed for each of the two surfaces of disc 150. Fluid 142 may help detach plants 120 from disc 150 in a gentle manner to prevent mechanical damage to plants 120. Optionally, detachment is based on fluid 142 being sprayed on disc 150 and scraper 130 provides a surface that directs plants 120 detached with fluid 142 toward trough 134. The spray nozzle may spray a thin layer of water or other fluid that may aid in detaching the plant parts from the disc without creating a spill flow. In this manner, the plants may be harvested with little extra fluid.

According to some example embodiments, operation of harvesting system 100 is automated and the automated operation is controlled by a controller 200. Controller 200 may include a user interface from which a user may selectively alter operation parameters for operating harvesting 100. Optionally, operational parameters of system 100 may be controlled based on one or more sensors 145. In some example embodiments, sensor 145 may include an imaging system and a processor and sensor 145 may sense density of plants on disc 150. Density may be detected based on output from the imaging system. In some example embodiments, a harvesting rate may be controlled by controller 200 based on controlling a rotational speed of shaft 160, based on controlling a depth at which disc 150 is immersed in culture medium 115 with plants 120 and may also be controlled based on controlling flow rate of culture medium 115 in tank 110. In some example embodiments axle 160 and motor 165 may be supported on a stand 162 that may be height adjusted, e.g. with a Z axis stage to alter depth of immersion of disc 150.

In some example embodiments, disc 150 may be 30-150 cm in diameter, e.g. 80 cm and may be submerged at a depth of 5-20 cm or 15-20 cm. Disc 150 may be selected to be thin enough to avoid creating openings through a mat formed with plants 120 while maintaining mechanical stability. Optionally, thickness of disc 150 may be 2-10 mm, e.g. 4-6 mm or 4 mm. Disc 150 may be formed from stainless steel, e.g. stainless steel 304, a polymer, e.g. polyethylene or polyvinylidene difluoride or other material that may provide adequate surface tension for accumulating plant 120.

In some example embodiments harvesting system 100 may include a plurality of stations around tank 110. Each station may include disc 150 including scrapers 130 and nozzles 140 supported by shaft 160 and rotated by a motor 165. Each station may also include dedicated troughs 134, channels 136 and a dedicated collection vat 138. Alternatively, plants 120 collected from a plurality of different stations may be channeled to a common collecting vat 138.

Figure 2:
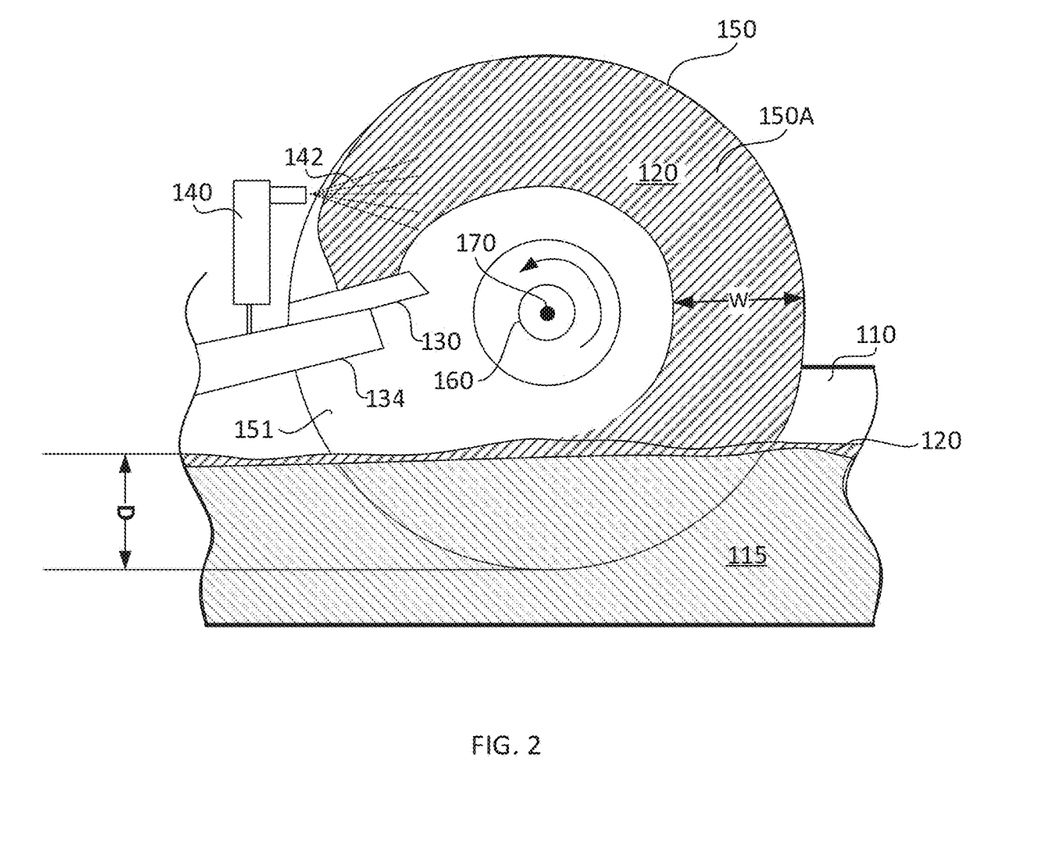
FIG. 2 is a simplified schematic drawing of an example disc with a scraper and a nozzle in accordance with some example embodiments.

Reference is now made to FIG. 2 showing a simplified schematic drawing of an example disc with scraper and nozzle in accordance with some example embodiments. According to some example embodiments, disc 150 is partially submerged in a culture medium 115 including a layer of plants 120. Plants 120 may be for example a floating (or immersed) mat of aquatic plants. As disc 150 is rotated about its axis 170, plants 120 in culture medium 115 adhere to surfaces of disc 150, e.g. surface 150A and forms a ring of biomass. A width W of the ring is defined by a depth D at which disc 150 is immersed in culture medium 115.

According to some example embodiments, a scraper 130 is positioned against surface 150A and collects plants 120 accumulated on surface 150A as disc 150 rotates. In some example embodiments, nozzle 140 sprays water on surface 150A just above scraper 130 to gently release plants 120 from surface 150A. Optionally nozzle 140 sprays fluid 142 at a height of about 2-10 cm above scraper 130. Optionally, fluid 142 sprayed by nozzle 140 is water or a water based solution that may help release plants 120 from surface 150A. Fluid supplied by nozzle 140 may additionally provide flow for transporting plants 120 from trough 134 through channel 136. As disk 150 rotates, a portion 151 of surface 150A that is cleaned with scraper 130 is immersed again in culture medium 115 and collects more plants 120. A similar process may be performed on a surface opposite surface 150A.

Scraper 130 is shown to be positioned at angle with respect to a radial direction on surface 150A but may alternately be aligned with the radial direction. Optionally, scraper 130 is sized to extend over a substantial portion a radius of disc 150 and including width W.

Figure 3:
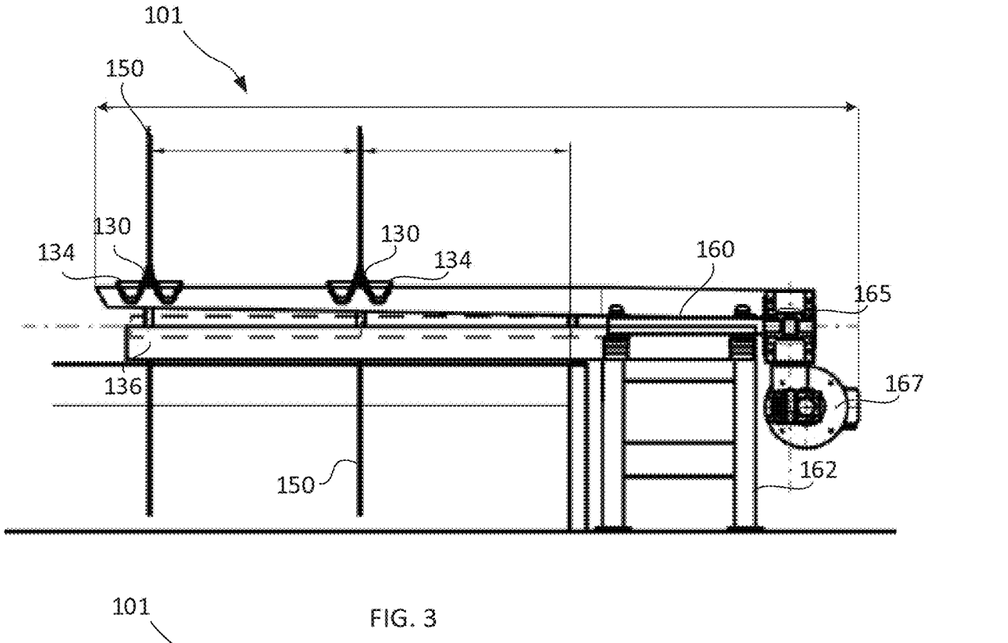
FIG. 3 is a side view of an example harvesting system in accordance with some example embodiments.
Figure 4:
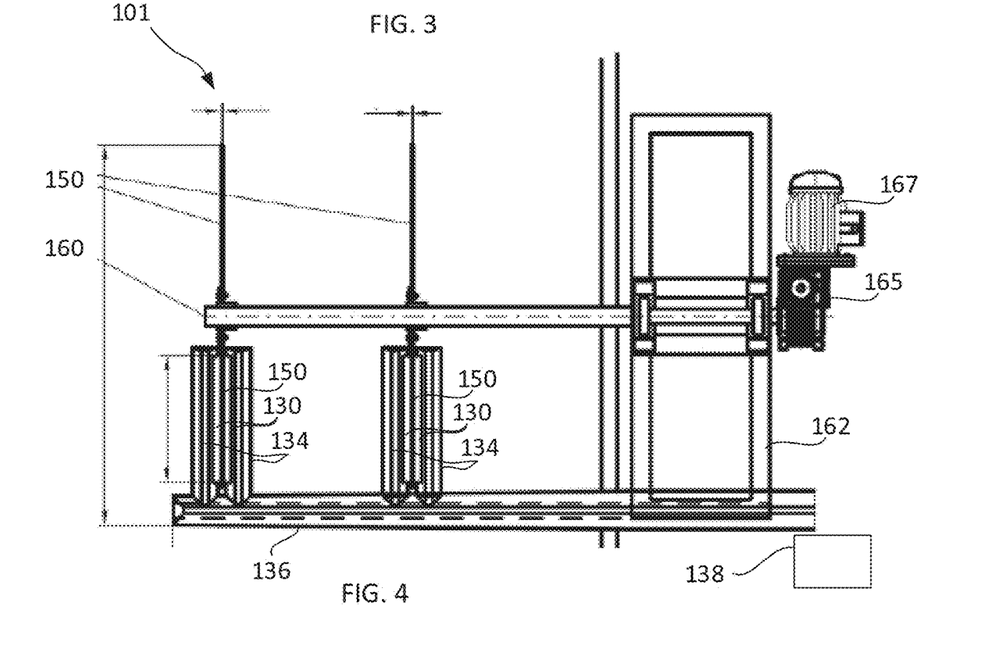
FIG. 4 is a top view of an example harvesting system in accordance with some example embodiments.

Reference is now made to FIG. 3 showing a side view of an example harvesting system and to FIG. 4 showing a top view of the example harvesting system both in accordance with some example embodiments. According to some example embodiments, a harvesting system 101 may include a plurality of discs 150 that are optionally supported and rotated by a common shaft 160. A pair of scrapers 130 and collecting channels 134 may be installed on each of discs 150. In some example embodiments, plants 120 collected in each of baths 134 is directed toward a channel 136 that continues to transport harvested plants to a collection vat. Optionally, discs 150 may be positioned on shaft 160 with a gap of 50-800 mm, e.g. 500 mm between them. Distance between discs 150 may be selected based on size of the tank in which they are immersed, a desired rate for harvesting and based on growing characteristics of the layer 120 of aquatic plants.

Figure 5:
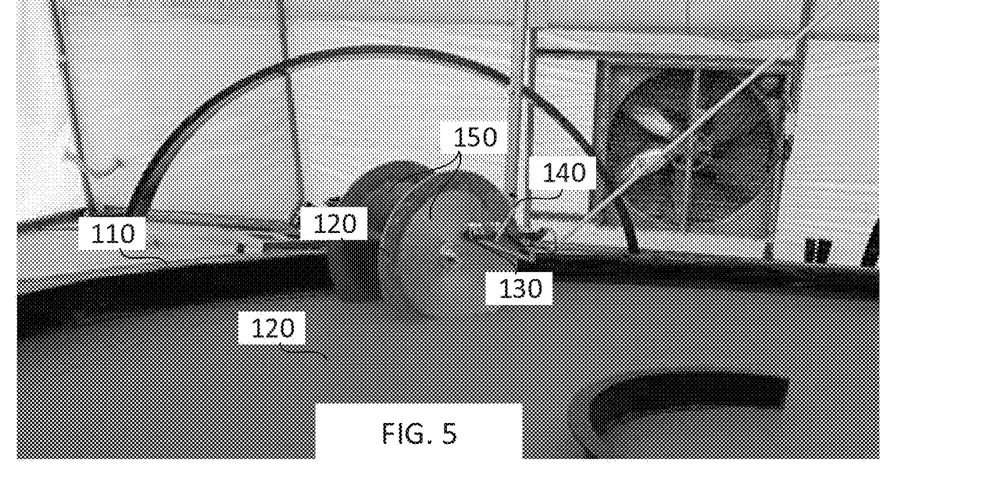
FIG. 5 is an image of an example pair of discs immersed in a culture medium in accordance with some example embodiments.
Figure 6:
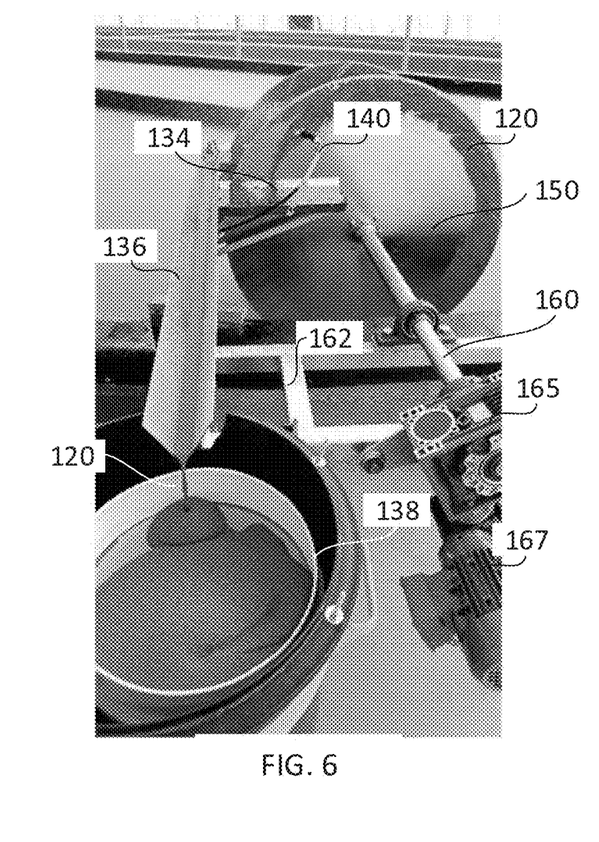
FIG. 6 is an image of an example channeling unit for directing the plants to a collection vat in accordance with some example embodiments.

Reference is now made to FIG. 5 showing an image of an example pair of discs immersed in a culture medium and to FIG. 6 showing an image of an example channeling unit for directing the plants to a collection vat both in accordance with some example embodiments. According to some example embodiments, harvesting system 101 includes two discs 150 supported on a common shaft 160. Each disc 150 is installed with a pair of scrapers 140 and a pair of nozzles 140, one on each surface of disc 150. Each of scrapers 130 and nozzles 140 may be fixed to a trough 134 that collects plants 120. Optionally, trough 134 is angled so that the collected plants may spill toward a channel 136 based on gravitation force. Optionally, directed water flow, a conveyer belt, or other mechanical means may urge the collected plants toward channel 136. In some example embodiments, troughs 134 may be attached and supported by channel 136 that may extend generally parallel to shaft 160 toward an edge of tank 110 and a collection vat 138. Channel 136 may be supported with frame 164 positioned adjacent tank 110. Optionally frame 162 may include structure extending over tank 110 to further support channel 136 as well as other elements of the harvesting system. Channel 136 and trough 134 may be formed from aluminum or other light weight material. Optionally, columns may be positioned in tank 110 to support elements of the harvesting system 101. In some example embodiments, frame 162 is mounted on a Z-axis (vertical) stage with which shaft 160 may be selectively lifted or lowered to position discs 150 at a desired depth of immersion.

Figure 7:
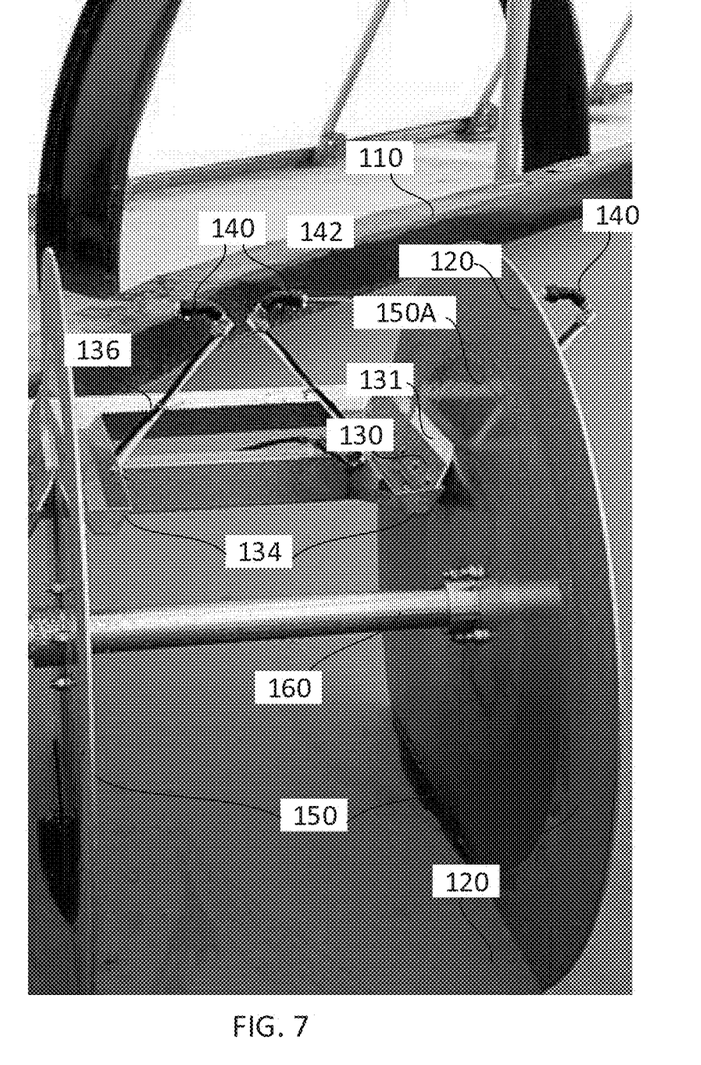
FIG. 7 is an image of an example scraper with watering nozzle in accordance with some example embodiments.

Reference is now made to FIG. 7 showing an image of example scraper with watering nozzle in accordance with some example embodiments. In some example embodiments, scraper 130 may include a blade 131. Optionally, scraper 130 with blade 131 is formed from stainless steel or aluminum. In other example embodiments, blade 131 may be formed from an elastic material. Scraper 130 is installed so that blade 131 touches the surface of disc 150 without substantially interfering with rotation of disc 150. Blade 130 may be fixed to trough 134 so that plants 120 scraped off disc 150 with scraper 130 may be collected and channeled to common channel 136 that may run generally parallel to shaft 160 but at an angle to provide flow of plants 120 with gravitation force. In some example embodiments, nozzle head 140 is fixedly attached to trough 134, e.g. with a bracket and positioned at an orientation in which nozzle 140 sprays fluid 5-15 cm above scraper 130 and generally normal to surface 150A. Optionally, spraying with nozzle 140 loosen the plants 120 from surface 150A so that plants may drop into trough 134.

Figure 8:
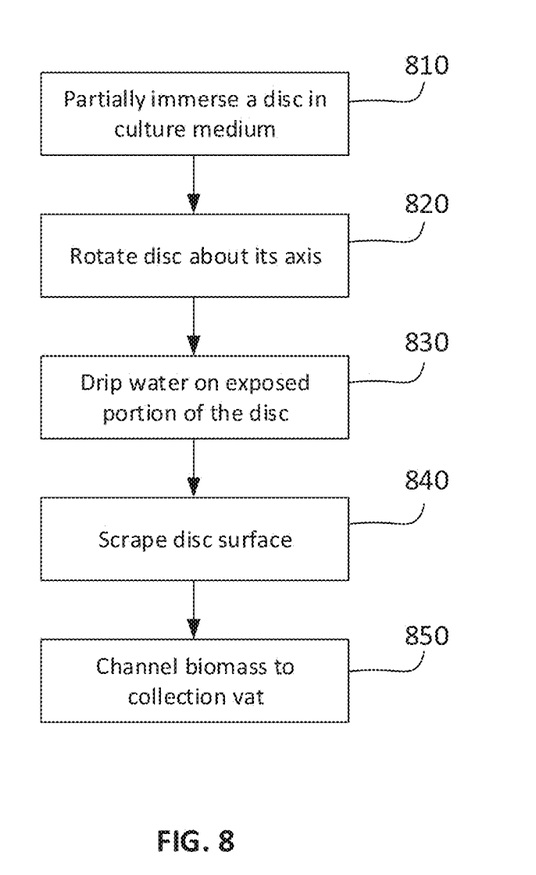
FIG. 8 is a simplified flow chart of an example method for harvesting in accordance with some example embodiments.

Reference is now made to FIG. 8 showing a simplified flow chart of an example method for harvesting in accordance with some example embodiments. According to some example embodiments, a disc that is supported on an axle is partially immersed in a culture medium in which aquatic plants are being cultured (block 810). In some example embodiments, the disc is immersed in a generally vertical orientation, e.g. with surfaces of discs being normal or substantially normal to surface of the body of water and with surfaces of the disc being generally parallel to a direction of flow of the body of water in the tank.

According to some example embodiments, the disc or discs are rotated with an axle which they are supported (block 820). Optionally, rotation is in a direction that corresponds with a direction of flow in the tank. As the disc rotates, plants may be collected on surfaces of the disc.

According to some example embodiments, the plants collected on the disc may be released by spraying water on a portion of the disc above surface of the culture medium (block 830). A scraper position against disc 150 may scrap a surface of disc 150 to collect the plants (block 840). The plants collected may then be channeled with flow based on gravitation motion to a collection vat (block 850).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

Figure 9:
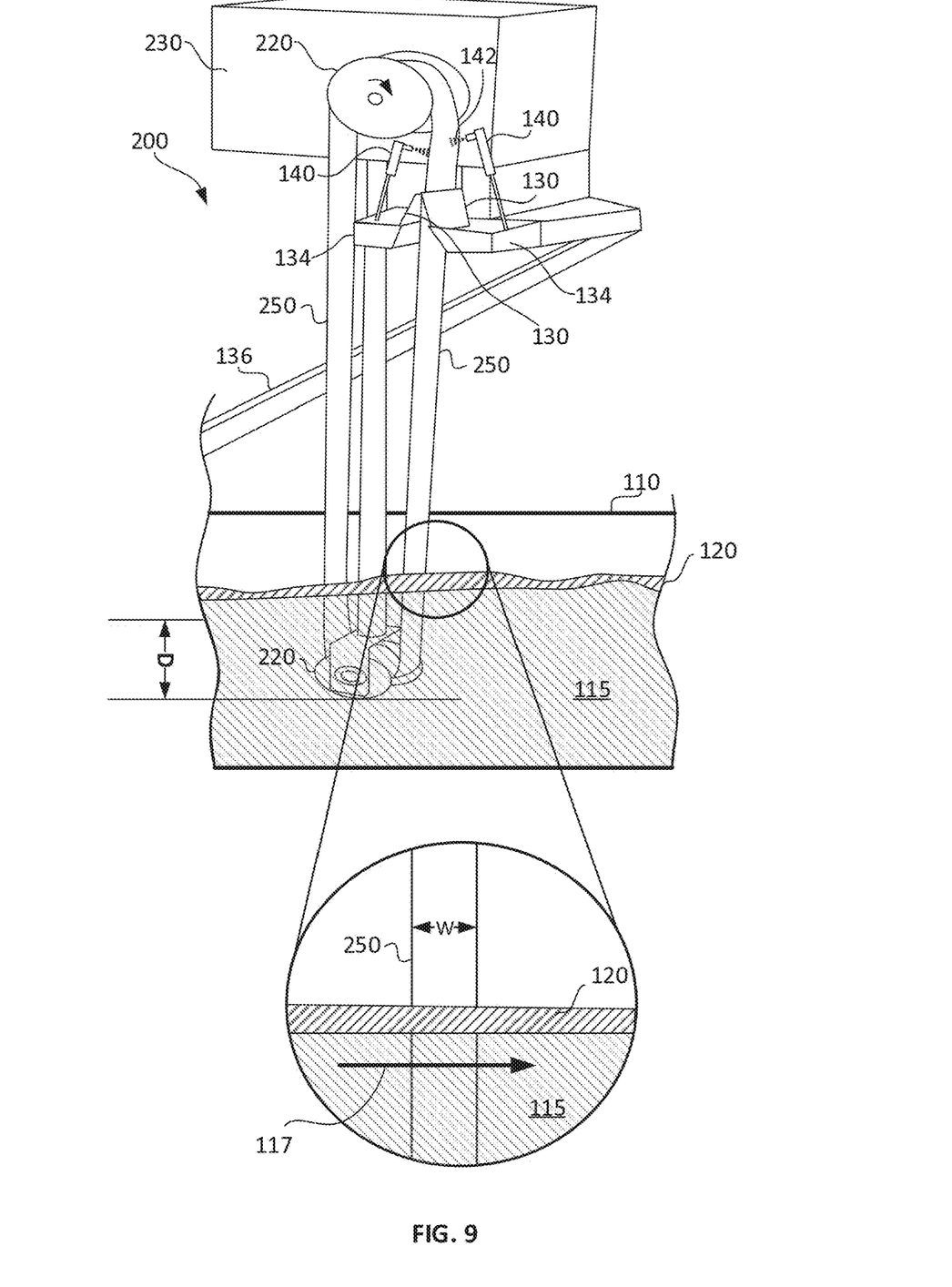
FIG. 9 is a simplified schematic drawing of another example harvesting system in accordance with some example embodiments.

Reference is now made to FIG. 9 showing a simplified schematic drawing of another example harvesting system in accordance with some example embodiments. According to some example embodiments, a harvesting system 200 is a conveyor type system and includes an endless belt 250 and an electric motor and drive unit 230. Belt 250 may be suspended from a pulley 220, with the lower portion immersed in culture medium 115 including aquatic plants 120. As belt 250 descends into medium 115, aquatic plants 120 adheres to one or both sides of the belt. One or more scrapers 130 mounted along belt 250. The harvested aquatic plants (the biomass) may be collected into a trough 134 and channeled via channel 136 to a collection vat.

According to some example embodiments, belt 250 may be partially immersed in culture medium 115 so that its surface is substantially parallel to a direction of flow 117, e.g. a width W extends along direction of flow 117 in tank 110. In this manner, the conveyor motion does not significantly disrupt a surface of growing aquatic plants 120 in medium 115.

In some example embodiments, only one surface of the belt is formed from material on which the aquatic plants may adhere and the second surface is not configured to accumulate the plants. In this manner, the aquatic plants are not pressed between belt 250 and pulley 220. In other example embodiments, harvesting system 200 may include a dedicated scraper 130 that removes the aquatic plants on one side of the belt prior to the aquatic plants reaching the upper pulley 220.

Figure 10:
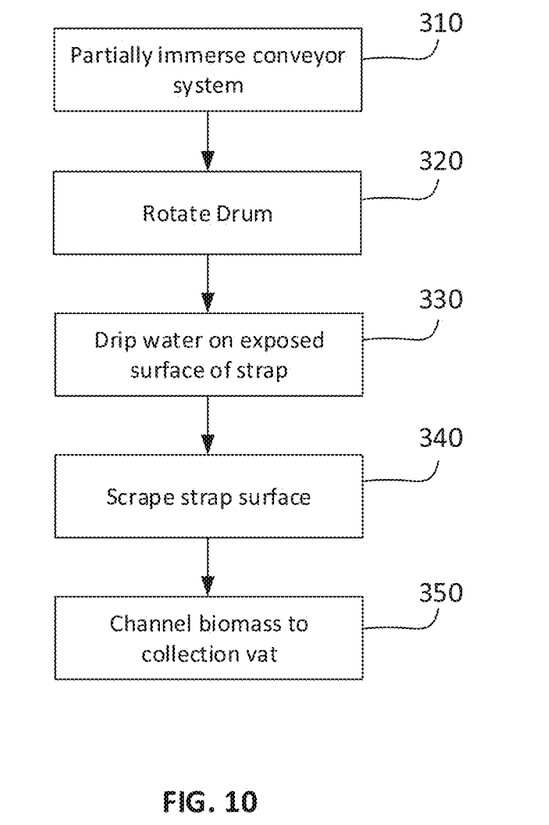
FIG. 10 is a simplified flow chart of another example method for harvesting in accordance with some example embodiments.

Reference is now made to FIG. 10 showing a simplified flow chart of another example method for harvesting in accordance with some example embodiments.

According to some example embodiments, a conveyor belt system is partially immersed in a culture medium in which aquatic plants are being cultured (block 810). In some example embodiments, the conveyer belt system is partially immersed, e.g. with surfaces of the belt positioned generally parallel to a direction of flow in the tank.

According to some example embodiments, the belt is advanced in and out of the culture medium based on rotating drums of the conveyor system (block 820). As the belts advances, plants may be collected on surfaces of the belt.

According to some example embodiments, the plants collected on the disc may be released by spraying water on a portion of the belt above surface of the culture medium (block 830). A scraper position against the belt may scrap a surface of belt to collect the plants (block 840). The plants collected may then be channeled based on gravitation motion to a collection vat (block 850).

Figure 11A:
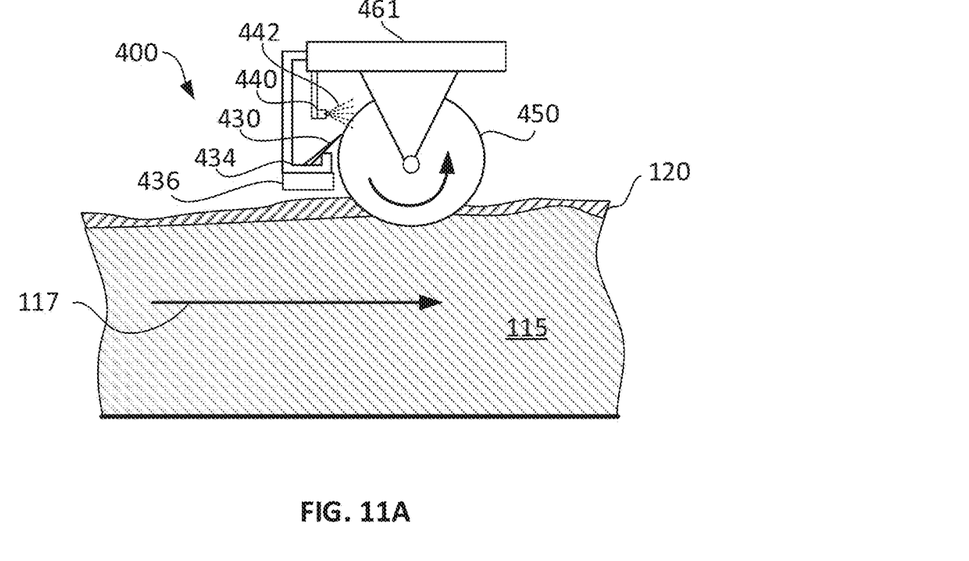
FIGS. 11A and 11B is a simplified schematic side and front drawing of yet another example harvesting system in accordance with some example embodiments.
Figure 11B:
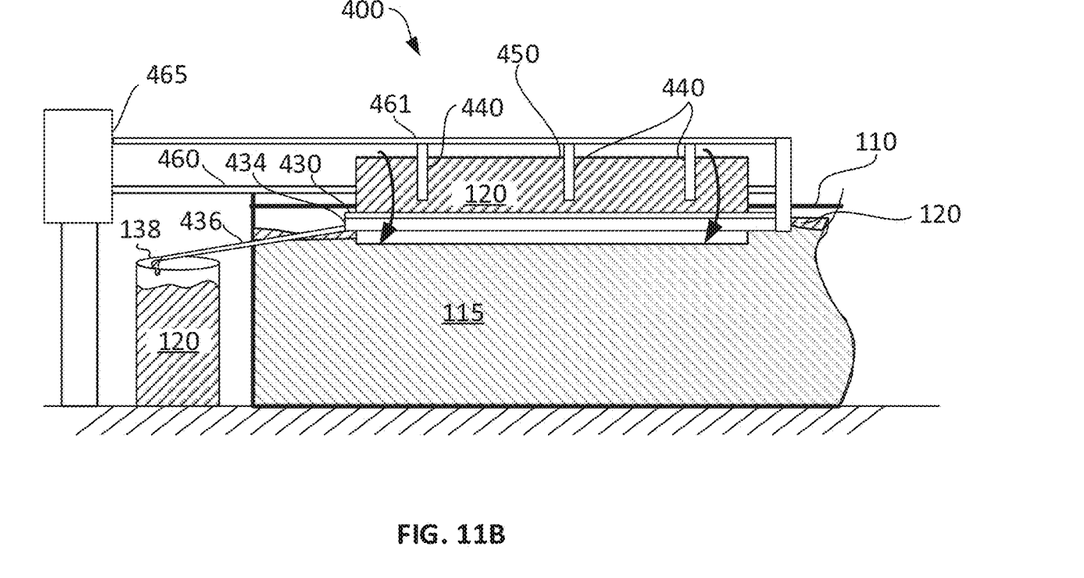

Reference is now made to FIGS. 11A and 11B showing a simplified schematic side and front drawing of yet another example harvesting system in accordance with some example embodiments. In some example embodiments, According to some example embodiments, a harvesting system 400 is a roller type system and includes a roller 450 and an electric motor and drive unit 465. Roller 550 may be rotatably supported on an axle 460. Axle 460 may be engaged with electric motor and drive unit 465. A scraper 430 may extend along length of roller 450 and a trough 434 may collect plants 120 that is scraped. A channel 436 may direct collected plants to a collection vat 138. A shaft 461 may support the trough 434 and scraper 430. One or more water drip or spraying nozzles 440 may spray water on the roller to aid in releasing plants 120 from roller prior to scraping. The water nozzles may also be supported on shaft 461.

According to some example embodiments, roller 450 may be partially immersed in culture medium 115 so that its longitudinal axis is substantially perpendicular to a direction of flow 117, e.g. a length of roller 450 is perpendicular to a direction of flow 117 in tank 110. In this manner, the conveyor motion does not significantly disrupt a surface of growing aquatic plants 120 in medium 115. In other example embodiments, roller 450 may be aligned with a direction of flow 117.

EXAMPLES

Reference is now made to the following examples, which together with the above descriptions illustrate some embodiments of the invention in a non-limiting fashion.

Example 1

Figure 12A:
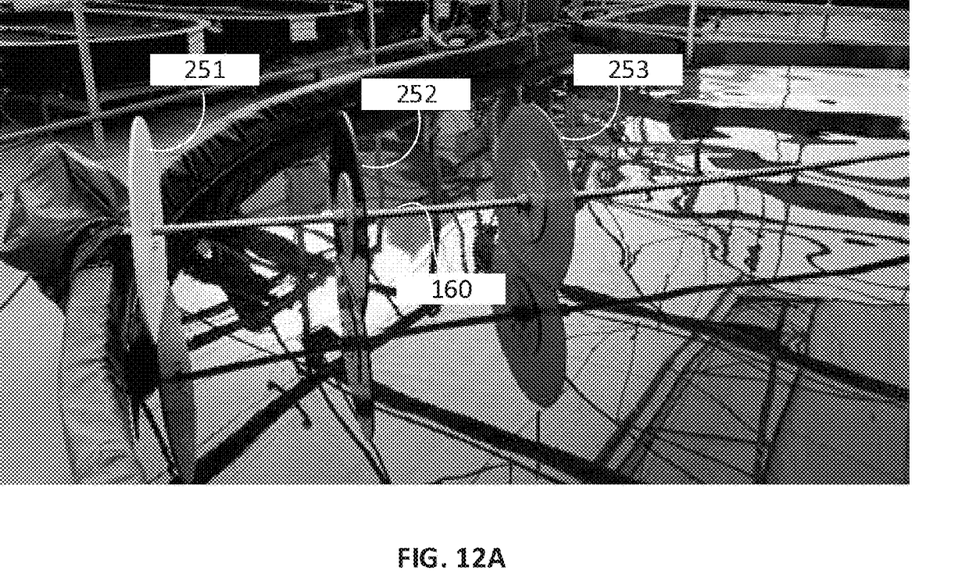
FIGS. 12A and 12B is an example prototype of the harvesting system in accordance with some example embodiments.
Figure 12B:
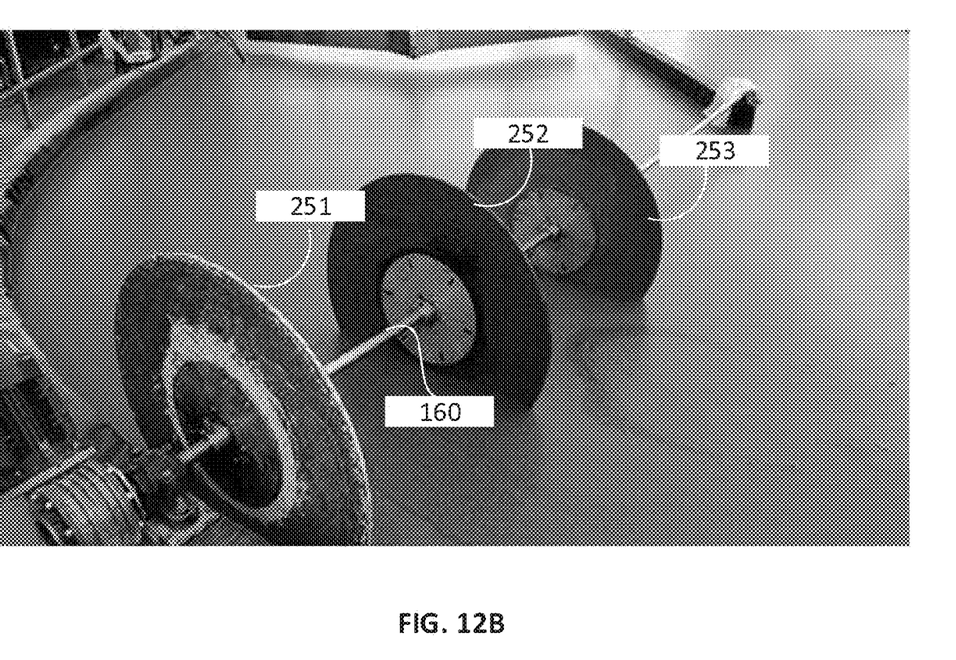

A harvesting system prototype shown in FIGS. 12A and 12B was made with three discs, 80 cm in diameter all supported on a common shaft 160. Each of the discs was made from different material:

1) Polyethylene (252);
2) Stainless steel 304 (253); and
3) PolyVinylidene DiFluoride (PVDF) (251).

The three discs were partially submerged at a depth of 10-15 cm in a tank including *wolffia* culture as shown in FIG. 12B. The *wolffia* culture was at a density of 400-800 gm/m$^2$, which enabled substantially full coverage of the water surface area. The discs were rotated at a rotating speed of 1.5-3.0 rpm. The adhesion ability of the plant, e.g. the fronds to each of the discs material under different depth and speed condition was studied. Harvesting was achieved on each of the three discs. The highest harvesting capacity of the *wolffia* culture was achieved with the stainless-steel disc 253 in all various conditions tested.

Example 2

A harvesting system as shown in FIG. 5 including two spinning stainless steel 304 discs 150 with a diameter of 90 cm was constructed and installed in a tank 110 including a *wolffia globosa* culture with an approximate surface density of 600 gm/m$^2$. The tank includes a raceway curve. The harvesting system was positioned at the beginning of the raceway curve of tank 110. The spinning discs 150 were inserted into the culture a depth of 15-18 cm and rotated at a rotation speed of 2.4 RPM. The rotation was controlled by variable frequency converter. A scraper 130 made from PVDF were installed to scrap the plants off of surface of discs 150.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A harvesting system for harvesting aquatic plants in or floating on a culture medium, the system comprising:
    a harvesting bed configured to be circulated in and out of the culture medium;
    an actuator configured to circulate the harvesting bed;
    a scraper positioned against a surface of the harvesting bed and configured to scrape the aquatic plants off the surface;
    a nozzle configured to release the aquatic plants from the surface prior to scraping based on spraying fluid at a height above a position of the scraper;
    a fluid source configured to supply the nozzle with the fluid;
    a channel configured to transport the aquatic plants removed by the scraper; and
    a collection vat configured to receive the aquatic plants transported via the channel.

2. The system according to claim 1, wherein the harvesting bed is a plate and wherein the actuator is configured to rotate the plate about an axis of rotation, wherein the axis of rotation is perpendicular to the harvesting bed.

3. The system according to claim 2, wherein the plate is fixedly supported on an axle and wherein the actuator is configured to rotate the axle.

4. The system according to claim 2, comprising a plurality of plates is fixedly supported on a single axle and wherein the actuator is configured to rotate the axle.

5. The system according to claim 2, wherein the plate is disc shaped.

6. The system according to claim 2, wherein the plate has a thickness of 1-15 mm.

7. The system according to claim 2 comprising a Z axis adjuster configured to position the plate at a desired height.

8. The system according to claim 1, wherein the harvesting bed is a belt.

9. The system according to claim 8, wherein the belt is an endless belt that is circulated with a conveyor system.

10. The system according to claim 8, wherein the belt is configured to be immersed in the culture medium such that a surface of the belt is parallel to a direction of flow in a tank containing the culture medium.

11. The system according to claim 1, wherein the harvesting bed is a roller.

12. The system according to claim 1, wherein the scraper is stationary and circulation of the harvesting bed is configured to actuate scraping of the aquatic plants.

13. The system according to claim 1, wherein the scraper is fixedly attached to a trough configured to collect the aquatic plants scraped by the scraper.

14. The system according to claim 13, wherein the trough is tilted toward the channel.

15. The system according to claim 1 wherein the harvesting bed includes two opposite facing surfaces on which the aquatic plants are harvested and a pair of the scraper, each scraper of the pair positioned against one of the two opposite facing surfaces of the harvesting bed.

16. The system according to claim 1, wherein the fluid is water.

17. The system according to claim 1, wherein the harvesting bed includes two opposite facing surfaces on which the aquatic plants are harvested and a pair of the nozzle, each nozzle of the pair configured to spray fluid on one of the two opposite facing surfaces.

18. The system according to claim 1 comprising a controller configured to control a rate of the circulating.

19. A method for harvesting aquatic plants in or floating on a culture medium, the method comprising:
    partially immersing a harvesting bed in a culture medium, the culture medium comprising aquatic plants;
    circulating the harvesting bed in and out of the culture medium;
    scraping the aquatic plants adhering to the harvesting bed as the harvesting bed is being circulated;
    releasing the aquatic plants adhering to the harvesting bed prior to scraping based on spraying the harvesting bed above the scraper with a fluid;
    channeling the aquatic plants removed by the scraper toward a collection vat; and
    collecting the aquatic plants in the collection vat.

20. The method according to claim 19, wherein the harvesting bed is a plate.

21. The method according to claim 20, wherein the scraping is actuated based on the rotating of the plate.

22. The method according to claim 20, comprising aligning an edge of the plate with a direction of flow of the culture medium.

23. The method according to claim 20, comprising aligning a surface of the plate at an acute angle with respect to a direction of flow of the culture medium.

24. The method according to claim 20 comprising partially immersing a plurality of plates in a culture medium wherein the plurality of plates displaced from each other by a defined distance and wherein the plurality of plates are rotated about a same axis of rotation.

25. The method according to claim 19, wherein the harvesting bed is an endless belt that is circulated with a conveyor system.

26. The method according to claim 25 comprising immersing the endless belt in the culture medium such that a surface of the belt is parallel to a direction of flow in a tank containing the culture medium.

27. The method according to claim 25 comprising aligning a surface of the belt at an acute angle with respect to a direction of flow of the culture medium.

28. The method according to claim 19, wherein the harvesting bed is a roller.

29. The method according to claim 28, comprising positioning a longitudinal axis of the roller perpendicular to a flow direction of the culture medium.

* * * * *

UNITED STATES PATENT AND TRADEMARK OFFICE
CERTIFICATE OF CORRECTION

PATENT NO. : 10,925,212 B2  
APPLICATION NO. : 16/294956  
DATED : February 23, 2021  
INVENTOR(S) : Miri Lapidot et al.

Page 1 of 1

It is certified that error appears in the above-identified patent and that said Letters Patent is hereby corrected as shown below:

On the Title Page

Item (71) Applicant: "Hineman Ltd., Rihson LeZion (IL)" should be changed to -- Hinoman Ltd., Rishon LeZion (IL) --

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*